US007131212B1

(12) United States Patent
Kao et al.

(10) Patent No.: US 7,131,212 B1
(45) Date of Patent: Nov. 7, 2006

(54) MARKING DEVICE

(75) Inventors: Chih-Tsung Kao, Taipei (TW); Tzu-Feng Tseng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 11/204,276

(22) Filed: Aug. 15, 2005

(30) Foreign Application Priority Data

Jun. 24, 2005 (TW) ............................... 94121111 A

(51) Int. Cl.
*B26D 1/00* (2006.01)
*G01C 15/02* (2006.01)

(52) U.S. Cl. .......................................... 33/633; 33/286

(58) Field of Classification Search .................. 33/628, 33/227, 228, 286, 633, 641, DIG. 21
See application file for complete search history.

(56) References Cited

U.S. PATENT DOCUMENTS 4,426,055 A * 1/1984 Reedy et al. ................. 33/286
6,195,902 B1 * 3/2001 Jan et al. ...................... 33/286
6,817,111 B1 * 11/2004 Corrado ....................... 33/632
7,066,627 B1 * 6/2006 Chen ........................... 83/520
2001/0049988 A1 12/2001 Ushiwata et al.
2006/0162513 A1 * 7/2006 Knight et al. .................. 83/13

FOREIGN PATENT DOCUMENTS

CA 2488994 6/2005

* cited by examiner

*Primary Examiner*—Christopher Fulton

(57) ABSTRACT

A marking device of a trimming apparatus includes a light source member, a lever member and a supporting member. The lever member includes a first sustaining arm, a second sustaining arm and a channel formed between the first sustaining arm and the second sustaining arm. The rear end of the light source member is fixed in the channel. The supporting member includes a sleeve for accommodating the front end of the light source member therein and an upper wing extending upwardly from the sleeve and conforming to the lever member. The upper wing includes a bolt hole corresponding to the second sustaining arm of the lever member. A resilient element is confined between the upper wing and the first sustaining arm. A screw penetrates through the bolt hole and is in contact with the second sustaining arm so as to render compression of the resilient element.

10 Claims, 5 Drawing Sheets

MARKING DEVICE

FIELD OF THE INVENTION

The present invention relates to a marking device, and more particularly to a marking device of a trimming apparatus for marking a trimming line by using a position adjustable mechanism.

BACKGROUND OF THE INVENTION

In a co-pending Taiwanese Patent Application No. 093106536, entitled “Trimming Device”, filed by the same assignee of the present application on Mar. 11, 2004, a manually operable desktop trimming apparatus includes a laser beam generator for projecting a trimming line onto a sheet article to be trimmed such that the user is capable of precisely discriminating the actual position for trimming the sheet article.

The marking device mounted on the trimming apparatus, i.e. the laser beam generator, may be aberrant due to improper operation or careless impact. Therefore, the trimming line, which is projected from the marking device onto the sheet article, is somewhat aberrant from the actual trimming position.

In view of the above-described disadvantages, the applicant keeps on carving unflaggingly to develop a marking device having a position adjustable mechanism according to the present invention through wholehearted experience and research.

SUMMARY OF THE INVENTION

As previously described, since the conventional marking device of the manually operable desktop trimming apparatus lacks for a position adjustable mechanism, the operator fails to correct the marking device once it is aberrant.

It is an object of the present invention to adjust the position of a marking device in a simple and quick manner without dismantling the marking device. Accordingly, maintenance of the marking device is cost-effective and less labor consuming.

In accordance with an aspect of the present invention, there is provided a marking device of a trimming apparatus for marking a trimming line. The marking device comprises a light source member, a lever member, a supporting member, a resilient element and a first screw. The light source member comprising an illuminating element for generating a source light and a refracting element for converting the source light into a linear light beam to be outputted. The lever member comprises a first sustaining arm, a second sustaining arm and a channel formed between the first sustaining arm and the second sustaining arm, wherein a portion of the light source member is fixed in the channel. The supporting member comprises a sleeve for accommodating another portion of the light source member therein and an upper wing extending upwardly from the sleeve and conforming to the lever member, wherein the upper wing comprises a first bolt hole corresponding to the second sustaining arm of the lever member. The resilient element is confined between the upper wing and the first sustaining arm of the lever member. The first screw penetrates through the first bolt hole and is in contact with the second sustaining arm of the lever member so as to render compression of the resilient element.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
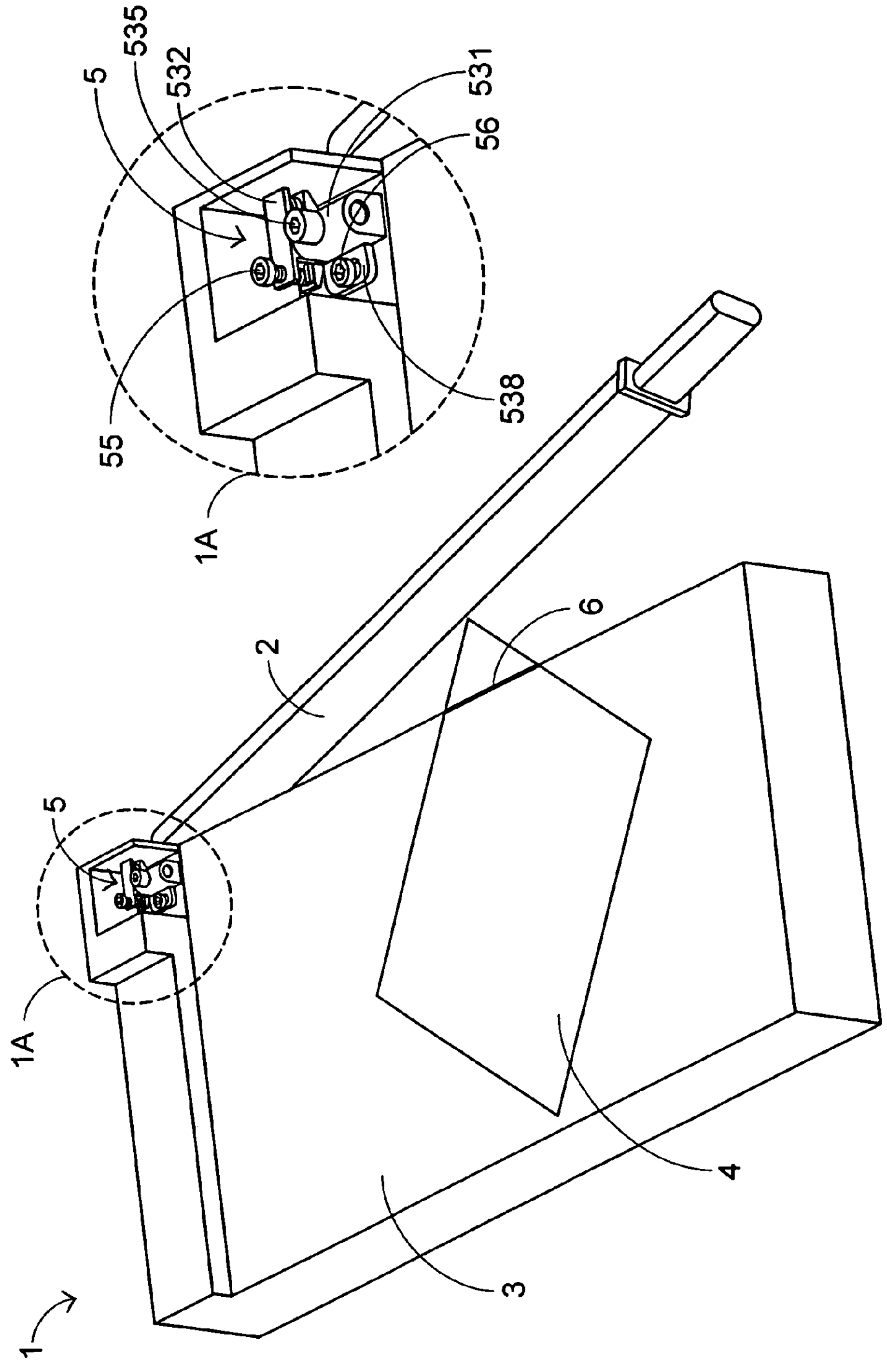
FIG. 1 is a schematic partial enlarged three-dimensional view of a marking device for use in a trimming apparatus according to a preferred embodiment of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention. In addition, the elements or structures in the drawings are not limited to the precise form disclosed. Unless specifically stated, the individual element may be extensive to include multiple elements or structures.

Referring to FIG. 1, a schematic view of a marking device for use in a trimming apparatus according to a first preferred embodiment of the present invention is illustrated. The desktop trimming apparatus 1 of FIG. 1 is manually operable and comprises a trimmer 2, a trimming platform 3, sheet articles 4 to be trimmed, and a marking device 5. The sheet articles 4 are placed on the trimming platform 3. The trimmer 2 is disposed on one side of the trimming platform 3 for trimming the sheet articles 4 on the trimming platform 3. The marking device 5 is disposed on the trimming platform 3 and adjacent to the trimmer 2. During operation of the marking device 5, a linear beam from the marking device 5 is projected onto the sheet articles 4 so as to mark a trimming line 6.

Figure 2C:
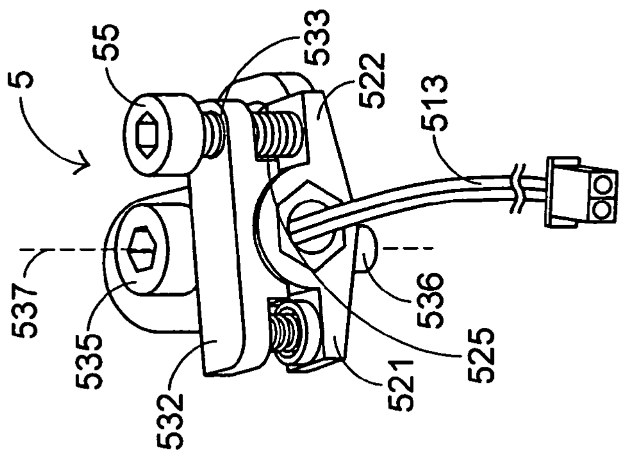
FIGS. 2A to 2C respectively illustrate exploded and assembled views of the marking device according to a preferred embodiment of the present invention.
Figure 2B:
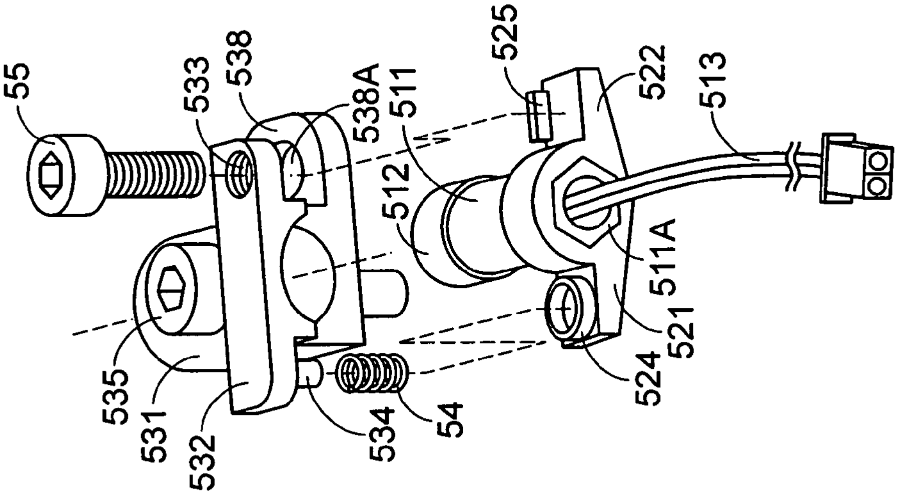
Figure 2A:
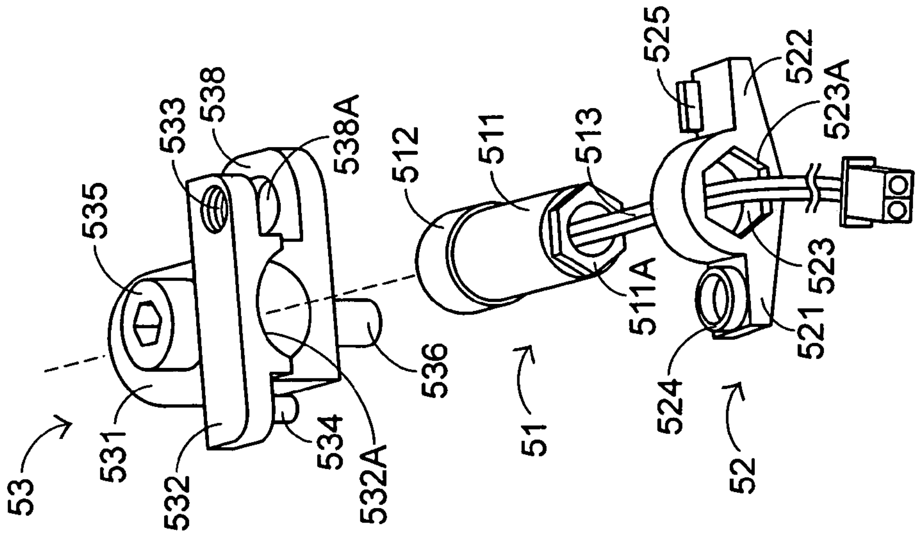

Please refer to FIGS. 2A to 2C, which respectively illustrate exploded and assembled views of the marking device 5 of the above embodiment. As shown in FIG. 2A, the marking device 5 principally comprises three parts, i.e. an approximately cylindrical light source member 51, a lever member 52 and a supporting member 53. The lever member 52 is coupled to the rear end of the light source member 51. The front end (i.e. the light output end) of the light source member 51 is accommodated within the supporting member 53. The light source member 51 includes a housing 511, an illuminating element (not shown) within the housing 511, and a refracting element 512 sheathed around the front end of the housing 511. By means of the refracting element 1512, the point source light emitted from the illuminating element would be converted into a linear source light accordingly. Examples of the illuminating element include but are limited to a laser diode, a light emitting diode (LED) and an organic light-emitting diode (OLED). An exemplary refracting element 1512 includes a lens such as a cylindrical lens or other optical element such as a landscape lens. Via a power cord 513, the light source member 51 is electrically connected to a power supply apparatus (not shown) to receive electricity therein.

Please refer to FIG. 2A again. The lever member 52 of the present invention comprises two sustaining arms 521 and 522, and a channel 523 between the sustaining arms 521 and 522. The rear end of the light source member 51 is fixed in the channel 523. In addition, a well-shaped recess 524 is disposed on the sustaining arm 521 of the lever member 52. A stopping piece 525 facing to the supporting member 53 is protruded from a surface of the other sustaining arm 522 of the lever member 52.

The supporting member 53 shown in FIG. 2A includes a sleeve 531 and a horizontal upper wing 532 extending upwardly from the sleeve 531. The light source member 51 is appropriately accommodated within the sleeve 531. The configuration of the upper wing 532 conforms to that of the lever member 52. The upper wing 532 further comprises a bolt hole 533 corresponding to the sustaining arm 522 of the lever member 52. In addition, the lower periphery 532A of the upper wing 532 is arched and supported by the lever member 52. In such manner, the lever member 52 is permitted to smoothly rotate in a limited range.

Please refer to FIGS. 2A and 2B. For a purpose of fixing the rear end of the light source member 51 in the channel 523 between the sustaining arms 521 and 522 of the lever member 52 and permitting synchronous rotation of the light source member 51 and the lever member 52, the rear end of the light source member 51 further comprises an outer-hexagonal socket 511A and the channel 523 of the lever member 52 has a hexagonal inner wall 523A matching to the outer-hexagonal socket 511A. As such, the rear end of the light source member 51 would be secured onto the lever member 52, as can be seen in FIG. 2B.

Please refer to FIGS. 2B and 2C. After the light source member 51 is coupled with the lever member 52, the operator can push the lever member 52 forwardly to have the front end of the light source member 51 plug into the sleeve 531 of the supporting member 53. Furthermore, a resilient element 54 such as a spring is arranged between the upper wing 532 and the well-shaped recess 524 of the sustaining arm 521. The spring 54 is also sheathed around a post 534 of the upper wing 532. Since the spring 54 is confined between the upper wing 532 and the well-shaped recess 524 of the sustaining arm 521, the compressed spring 51 would be released to rotate the lever member 52 anticlockwise. On the other hand, once a screw 55 penetrates through the bolt hole 533 and the sustaining arm 522 is pushed downwardly, the lever member 52 would be rotated clockwise arid the spring 54 is compressed again. That is to say, by adjusting the depth of the screw 55 penetrating through the bolt hole 533, the lever member 52 would be rotated anticlockwise or clockwise as required. Under this circumstance, a desired trimming line within a limited range would be projected from the light source member 51, which is plugged into the sleeve 531 of the supporting member 53.

Please refer to FIGS. 2B and 2C again. In order to prevent from detachment of the level member 52 and the supporting member 53 during rotation of the level member 52 relative to the supporting member 53, the screw 54 penetrating through the bolt hole 533 would be naturally stopped by the stopping piece 525 when the screw 55 is in contact with the sustaining arm 522.

Figure 3B:
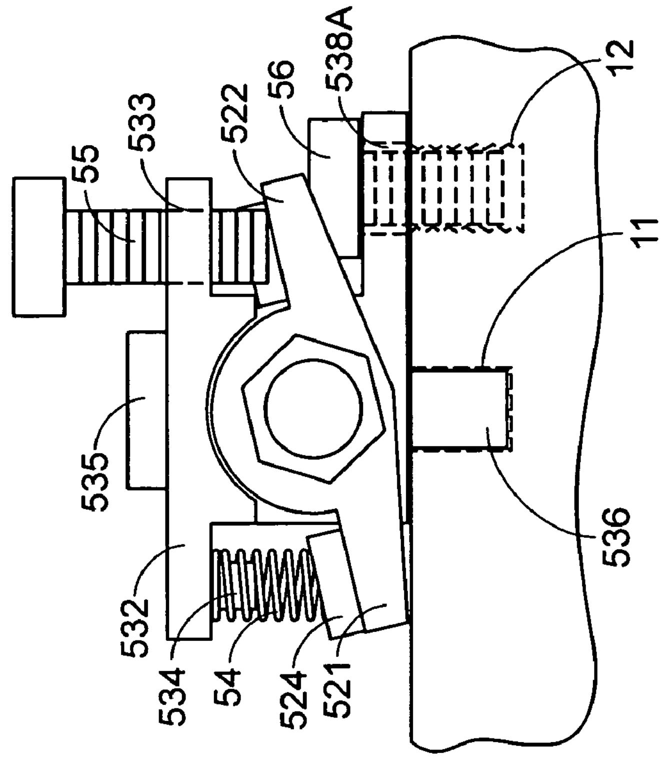
FIGS. 3A and 3B schematically illustrate rotation of the marking device by adjusting the depth of the screw penetrating through the bolt hole.
Figure 3A:
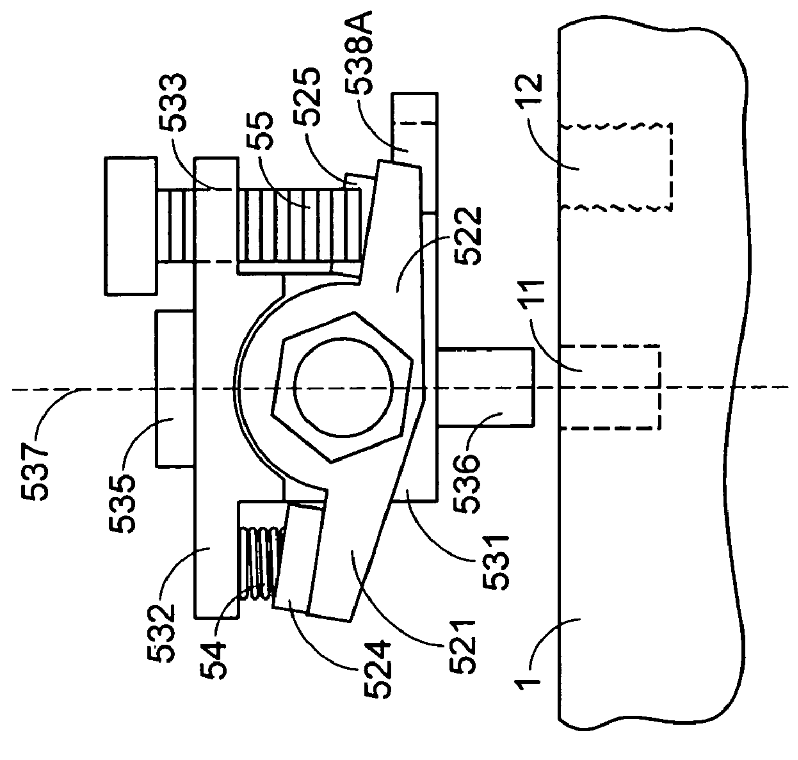

Referring to FIGS. 3A and 3B, rotation of the light source member 51 complies with rotation of the lever member 52 relative to the supporting member 53 and interaction of the spring 54 and the screw 55. In this embodiment, the screw 55 has an inner-hexagonal screw head. For a purpose of adjusting the depth of the screw 55 penetrating through the bolt hole 533, any hexagonal wrench mating with the inner-hexagonal screw head of the screw 55 may be used to spin the screw 55. It is noted that, however, those skilled in the art will readily observe that numerous modifications and alterations of the screw and the wrench may be made while retaining the teachings of the invention. For example, another type of screw and corresponding bolt hole and other means for spinning the screw head are desirable. Accordingly, the above disclosure should be limited only by the bounds of the following claims.

Please refer to FIGS. 3A and 3B again, which also illustrate the situations of mounting the marking device 5 on the trimming apparatus 1. The top surface of the trimming apparatus 1 comprises a circular hole 11 and a bolt hole 12. The supporting member 53 of the marking device 5 further comprises an inner-hexagonal socket 535 and a cylindrical rod 536 on top and bottom surfaces of the sleeve 531, respectively. Once the cylindrical rod 536 is inserted into the circular hole 11 of the trimming apparatus 1, the inner-hexagonal socket 535 and the cylindrical rod 536 have a common rotational axis 537. In addition, the supporting member 53 further comprises a lateral plate 538 extending from the bottom surface of the sleeve 531. The lateral plate 538 has a guiding hole 538A corresponding to the bolt hole 12 of the trimming apparatus 1. After the cylindrical rod 536 is inserted into the circular hole 11 and a screw 56 penetrates through the guiding hole 538A and is then screwed in the bolt hole 12, the supporting member 53 would be fixed on the trimming apparatus 1. By the way, since the guiding hole 538A is substantially an elongated slot, the supporting member 53 is pivotal about the cylindrical rod 536 with respect to the axis 537 within a limited range defined by the length of the elongated guiding hole 538A. Under this circumstance, the trimming line projected from the light source member 51, which is accommodated within the sleeve 531 of the supporting member 53, would be adjusted in the horizontal dimension.

Figure 4C:
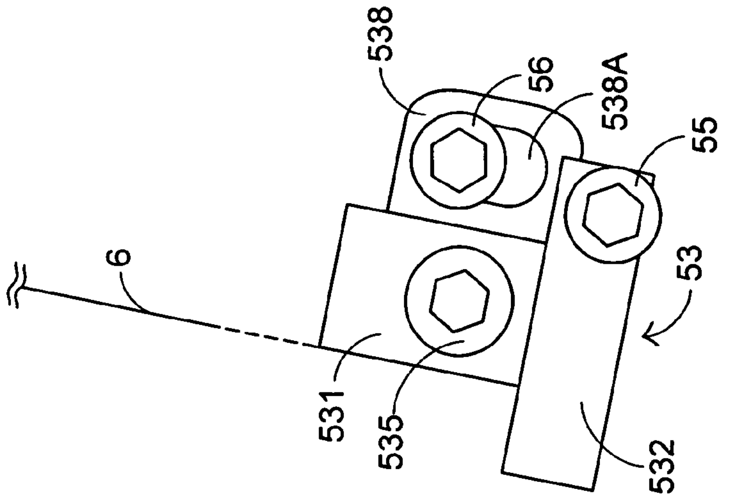
FIGS. 4A, 4B and 4C are schematic top views illustrating the principles of adjusting the trimming line by changing the angle of the marking device within the range defined by the elongated guiding hole.
Figure 4B:
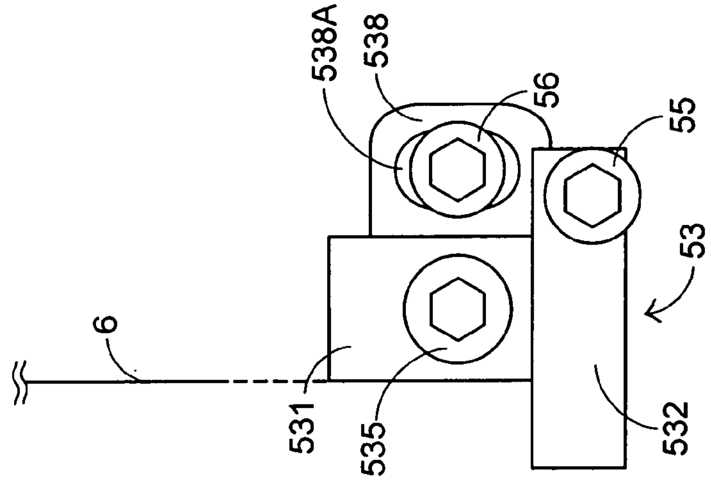
Figure 4A:
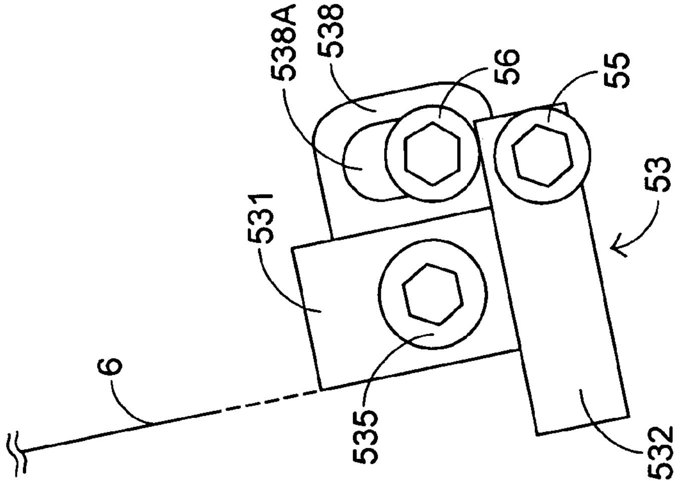

Please refer to FIGS. 4A, 4B and 4C, which are schematic top views illustrating the principles of adjusting the trimming line 6 by changing the angle of the marking device 5. By using any hexagonal wrench mating with the inner-hexagonal socket 535 on the sleeve 531, the marking device 5 is pivotal about the cylindrical rod 536 with respect to the axis 537 within the limited range defined by the elongated guiding hole 538A so as to change the angle of the marking device 5. The allowable rotating angle of the marking device 5 is dependent on the length of the elongated guiding hole 538A. In addition, since the screw 56 penetrates through the guiding hole 538A and is screwed in the bolt hole 12 (as shown in FIG. 3B), the marking device 5 is fixed on the trimming apparatus (as shown in FIG. 3B) during the period of changing the rotating angle of the marking device 5 without detachment. It is noted that, however, those skilled in the art will readily observe that numerous modifications and alterations of the inner-hexagonal socket 535 may be made while retaining the teachings of the invention. For example, the inner-hexagonal socket 535 may be replaced with an outer-hexagonal socket or hexagonal washer as long as suitable means for spinning the screw head are obtainable. Accordingly, the above disclosure should be limited only by the bounds of the following claims.

Figure 5B:
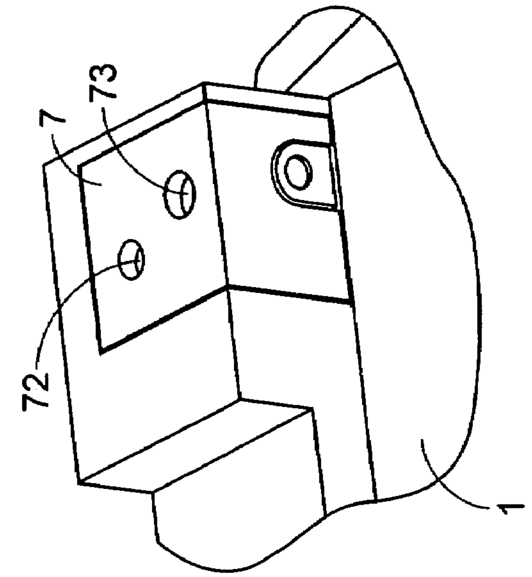
FIG. 5B schematically illustrates a marking device which is mounted on the trimming apparatus and has been sheltered with an upper cover.
Figure 5A:
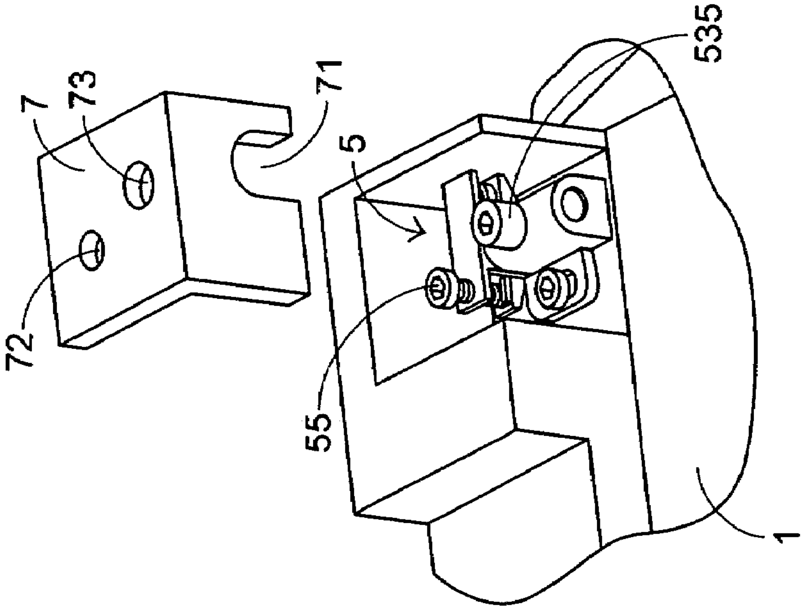
FIG. 5A schematically illustrates a marking device which is mounted on the trimming apparatus and has not been sheltered with an upper cover.

Please refer to FIGS. 5A and 5B. After the marking device 5 is mounted on the trimming apparatus 1, the marking device 5 may be sheltered with an upper cover 7. The upper cover 7 comprises three ports 71, 72 and 73 corresponding to the optical path of the marking device 5, the screw 55 and the inner-hexagonal socket 535, respectively. That is to say, the operator may insert desired means for spinning the screw head (e.g. a hexagonal wrench) to rotate the screw 55 and the inner-hexagonal socket 535 via the ports 72 and 73, respectively. In such manner, the operator would be quickly and precisely adjust the position of the trimming line accordingly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A marking device of a trimming apparatus for marking a trimming line, said marking device comprising:

- a light source member comprising an illuminating element for generating a source light and a refracting element for converting said source light into a linear light beam to be outputted;
- a lever member comprising a first sustaining arm, a second sustaining arm and a channel formed between said first sustaining arm and said second sustaining arm, wherein a portion of said light source member is fixed in said channel;
- a supporting member comprising a sleeve for accommodating another portion of said light source member therein and an upper wing extending upwardly from said sleeve and conforming to said lever member, wherein said upper wing comprises a first bolt hole corresponding to said second sustaining arm of said lever member;
- a resilient element confined between said upper wing and said first sustaining arm of said lever member; and
- a first screw penetrating through said first bolt hole and in contact with said second sustaining arm of said lever member so as to render compression of said resilient element.

2. The marking device according to claim 1 wherein said resilient element is a spring.

3. The marking device according to claim 2 wherein said upper wing further comprises a post protruded from a surface thereof and said first sustaining arm comprises a well-shaped recess thereon, wherein said spring is confined between said post of said upper wing and said well-shaped recess of said sustaining arm.

4. The marking device according to claim 1 wherein said supporting member further comprises a cylindrical rod under said sleeve.

5. The marking device according to claim 4 wherein said cylindrical rod is inserted into a circular hole of said trimming apparatus such that said supporting member is pivotal about said cylindrical rod.

6. The marking device according to claim 5 wherein said supporting member further comprises a lateral plate extended from the bottom surface of said sleeve, wherein said lateral plate has a guiding hole corresponding to a second bolt hole in said trimming apparatus, said supporting member is fixed on said trimming apparatus when a second screw penetrates through said guiding hole and is then screwed in said second bolt hole, and said supporting member is pivotal about said cylindrical rod within a limited range defined by said guiding hole.

7. The marking device according to claim 4 wherein said supporting member further comprises an inner-hexagonal socket protruding from the top surface of said sleeve and coaxial with said cylindrical rod upon rotation.

8. The marking device according to claim 1 wherein said supporting member further comprises a lateral plate extending from the bottom surface of said sleeve, wherein said lateral plate has a guiding hole corresponding to a second bolt hole in said trimming apparatus, and said supporting member is fixed on said trimming apparatus when a second screw penetrates through said guiding hole and is then screwed in said second bolt hole.

9. The marking device according to claim 1 further comprising a housing for accommodating said illuminating element, wherein one end of said housing has a shape of an outer-hexagonal socket, and said channel of said lever member 52 has a hexagonal inner wall matching to said outer-hexagonal socket of said housing.

10. The marking device according to claim 1 further comprising a stopping piece disposed on said second sustaining arm and between said first screw and said sleeve.

* * * * *